(12) United States Patent
Wallner et al.

(10) Patent No.: US 6,920,147 B2
(45) Date of Patent: *Jul. 19, 2005

(54) INPUT BUFFERING AND QUEUE STATUS-BASED OUTPUT CONTROL FOR A DIGITAL TRAFFIC SWITCH

(75) Inventors: John D. Wallner, Calabasas, CA (US); Chris L. Hoogenboom, Channel Islands Harbor, CA (US); Michael J. Nishimura, Torrance, CA (US); Michael K. Wilson, Thousand Oaks, CA (US)

(73) Assignee: Alcatel, Paris (FR)

( * ) Notice: Subject to any disclaimer, the term of this patent is extended or adjusted under 35 U.S.C. 154(b) by 345 days.

This patent is subject to a terminal disclaimer.

(21) Appl. No.: 10/186,103

(22) Filed: Jun. 28, 2002

(65) Prior Publication Data

US 2002/0163915 A1 Nov. 7, 2002

Related U.S. Application Data (63) Continuation of application No. 09/052,404, filed on Mar. 31, 1998, now Pat. No. 6,442,172, which is a continuation-in-part of application No. 08/679,360, filed on Jul. 11, 1996, now Pat. No. 5,768,257.

(51) Int. Cl.[7] .............................................. H04L 12/28
(52) U.S. Cl. ....................................... 370/416; 370/428
(58) Field of Search ............................. 370/416, 395.1, 370/230, 229, 413, 231, 236, 232, 235, 252, 253, 412, 428, 414, 415, 429; 709/231

(56) References Cited

U.S. PATENT DOCUMENTS

| | | | |
|---|---|---|---|
| 5,325,356 A | 6/1994 | Lyles | |
| 5,371,893 A | 12/1994 | Price et al. | |

\* cited by examiner

OTHER PUBLICATIONS

Chao, Jonathan H., et al., "Abacus Switch Figures ATM I/O," Design Supercon,'96, Communications Trends, Electronic Engineering Times, pp. 68 and 78, Jan. 15, 1996.

McKeown, N., et al., "High Performance Switching," Proposal to TI, Nov. 30, 1995.

*Primary Examiner*—Chi Pham
*Assistant Examiner*—Alexander O. Boakye
(74) *Attorney, Agent, or Firm*—Craig A. Hoersten; V. Lawrence Sewell (57) ABSTRACT

A digital traffic switch having DIBOC buffer control has a queue status-based control strategy to limit status traffic on the switch and status buffer requirements. Status messages are transmitted from inputs to outputs when the content status of a logical output queue has changed from "empty" to "not empty", or vice versa, rather than on a "per cell" request basis. Status messages are transmitted from outputs to inputs when the clearance status of a logical output queue has changed from "not clear to release" to "clear to release", or vice versa, rather than on a "per cell" grant basis. The status of each logical output queue is monitored at outputs by retaining and updating a single status bit which has a particular binary value when the logical output queue's status is "empty" and the opposite binary value when the logical output queue's status is "not empty". The status of each logical output queue is monitored at inputs by retaining and updating a single status bit which has a particular binary value when the logical output queue's status is "not clear to release" and the opposite binary value when the logical output queue's status is "clear to release". Outputs generate (but do not transmit) release grants in a logical order determined by running a grant generation algorithm. Inputs release discrete information units in a logical order determined by running a release algorithm. Status messages for logical output queues are re-transmitted when extra bandwidth is available to remove any inaccurate view of the status of the logical output queues resulting from transmission failures of the original status messages.

22 Claims, 6 Drawing Sheets

U.S. PATENT DOCUMENTS

| | | |
|---|---|---|
| 5,446,738 A | 8/1995 | Kim et al. |
| 5,448,559 A | 9/1995 | Hayter et al. |
| 5,448,701 A | 9/1995 | Metz, Jr. et al. |
| 5,459,455 A | 10/1995 | Sato |
| 5,475,679 A | 12/1995 | Munter |
| 5,511,070 A | 4/1996 | Lyles |
| 5,550,823 A * | 8/1996 | Irie et al. .................... 370/413 |
| 5,555,264 A | 9/1996 | Sallberg et al. |
| 5,768,257 A | 6/1998 | Khacherian et al. |
| 5,774,453 A | 6/1998 | Fukano et al. |
| 5,790,522 A | 8/1998 | Fichou et al. |
| 5,790,770 A | 8/1998 | McClure et al. |
| 5,864,539 A | 1/1999 | Yin |
| 5,892,766 A | 4/1999 | Wicki et al. |
| 6,044,061 A | 3/2000 | Aybay et al. |
| 6,144,635 A * | 11/2000 | Nakagawa .................. 370/229 |
| 6,212,182 B1 | 4/2001 | McKeown |

* cited by examiner

INPUT BUFFERING AND QUEUE STATUS-BASED OUTPUT CONTROL FOR A DIGITAL TRAFFIC SWITCH

CROSS REFERENCE TO RELATED APPLICATION

The present application is a continuation of U.S. application Ser. No. 09/052,404, filed Mar. 31, 1998, which is a continuation-in-part of U.S. application Ser. No. 08/679,360, filed Jul. 11, 1996, now U.S. Pat. No. 5,768,257, issued on Jun. 16, 1998.

BACKGROUND OF THE INVENTION

The present invention relates to digital LAN and WAN traffic switches, particularly asynchronous transfer mode (ATM) switches.

Figure 1:
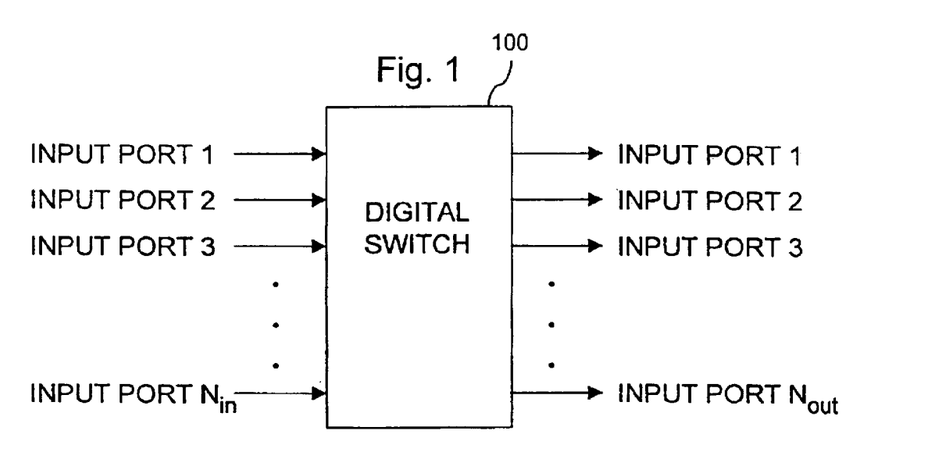
FIG. 1 is a generalized block diagram of a digital traffic switch.

An ATM cell switch takes cells from many sources, and routes them to many destinations. Such a switch may be hardware-based, or hardware- and software-based. The architecture can be generalized as shown in FIG. 1. Cells arrive on input ports 1 to $N_{in}$ and are switched through a switch fabric 100 to various ones of output ports 1 to $N_{out}$.

A cell is a fixed size unit which constitutes a fraction of a larger communication. Cells come in on input ports, and get routed to output ports.

Sometimes, collisions take place between cells. That is, cells come in on two or more input ports that are destined for the same output port. There are two scenarios which describe the condition when two or more cells are destined for the same output port: (1) momentary contention or cell collision; and (2) sustained contention or congestion.

In either case, the collisions create the need for queueing, where one or more cells have to wait in line to be delivered to the output port.

With some architectures, even when there are no collisions, blocking can take place. Blocking occurs when a cell cannot be delivered because the delivery of other cells is taking up the resources necessary for the delivery of the blocked cell. This is often referred to as "head of line" blocking. Blocking is undesirable, since it can delay the delivery of other cells. Also, blocked cells must be queued, just like cells delayed due to collisions.

Due to these inevitable delays in delivery, a successful architecture must properly queue cells for delivery to output ports. Such queueing is also referred to as "buffering". Buffering requires buffer control. Buffer control tells buffers when to release a cell from a queue for delivery to an output port.

Even with buffer control, it is sometimes necessary to "drop" cells. For instance, when cells come in on input ports "1" and "2", all destined for output port "3", it is often the situation that more cells come in than can be output from port "3". The cells begin to be queued-up in the buffers. If this situation persists, the buffers get filled-up, and cells must be thrown away, or "dropped". A good design minimizes the number of dropped cells.

A highly effective buffer control strategy is dynamic input buffering and output control (DIBOC). In a DIBOC architecture, a switch fabric has an input side and an output side for switching cells received at any of a plurality of input ports to any of a plurality of output ports. Cells received at the input side and destined for the output side are buffered at the input side. The output side monitors the status of the output ports, and eventually transmits grants to release the cells buffered in the input side. Buffering cells at inputs controlled by outputs has numerous advantages. First, input buffering means that cells are dropped before being transmitted across the switch fabric whenever dropping is required, reducing the traffic load on the switch fabric during congested periods. Second, output control means that the switch may be designed according to output port bandwidth limitations, improving scalability. Third, output control means that precise control algorithms may be implemented to allocate grants in a fair manner, i.e., output control allows grants to be allocated in a logical order based on considerations such as source input port, cell priority and destination output port.

Known DIBOC architectures have relied on handshaking procedures in which requests and grants are exchanged on a "per cell" basis to secure release of cells. In such handshaking procedures, the input side transmits to the output side a request for release for each cell received. Such requests typically identify a logical output queue for the cell, e.g., the cell priority level, output, etc. The output side either queues the entire requests in an request buffer, as in Hayter, U.S. Pat. No. 5,448,559, or increments a "backlog" value in a status buffer reserved for the logical output queue, as in Khacherian, application Ser. No. 08/679,360, pending the output side's issuance of,a grant to release the cell across the switching fabric to the identified output. The grants are issued on a "per cell" basis in a logical order by arbitrating among the logical output queues having at least one request pending.

Despite the significant advantages of DIBOC as an overall buffer control strategy, there is room to improve on the "per cell" handshaking procedures implemented in known DIBOC architectures. Such handshaking procedures have several weaknesses. First, a request must be transmitted to the output side for each cell even though the cell's logical output queue may already have a cell pending, resulting in the transmission of superfluous control traffic. Second, each request received by the output side must be queued even though the logical output queue with which the request is associated may already have a cell pending, or at the very least a multi-bit "backlog" value must be retained and updated for each logical output queue, imposing unnecessary status buffering requirements. Third, whenever a request does not reach the output side due to a collision or corruption during transmission, the output side develops an inaccurate view of the status of a logical output queue, which is not easily remedied. Analogous weaknesses arise in connection with the transmission of grants to the input side on a "per cell" basis. Accordingly, there is a need for a novel buffer control strategy which provides the traditional advantages of DIBOC without the side effects of "per cell" handshaking.

SUMMARY OF THE INVENTION

In its most basic feature, the present invention provides a DIBOC buffer control strategy for a digital traffic switch which avoids the side effects of "per cell" handshaking through the expedient of queue status-based buffer control.

In one aspect of the invention, the transmission of requests on a "per cell" basis is eliminated by relying on changes in the content status of logical output queues from "empty" to "not empty", or vice versa, as the basic triggering event for transmitting status messages from the input side to the output side. A "not empty" status message for a logical output queue is transmitted whenever the state of the logical output queue has changed from "empty" to "not empty". An "empty" status message is transmitted whenever the state of a logical output queue has reverted to "empty". The content status of each logical output queue is monitored at the output side by retaining and updating a single status bit which has a particular binary value (e.g., a "0") when the last-received status message indicates a logical output queue's status as "empty" and the opposite binary value (e.g., a "1") when the last-received status message indicates a logical output queue's status as "not empty". The output side may then, in a logical order, grant clearance to logical output queues whose content status is indicated as "not empty" to release discrete information units from the input side to the output side. By limiting the transfer frequency and output-retained bit-count of content status information to the instances and information required to effectuate the logical order for granting clearance to release discrete information units, control traffic and status buffering requirements are reduced.

In another aspect, the transmission of grants on a "per cell" basis is eliminated by relying on changes in the clearance status of logical output queues from "clear to release" to "not clear to release", or vice versa, as the basic triggering event for transmitting status messages from the output side to the input side. A "clear to release" status message for a logical output queue is transmitted whenever the status of the logical output queue has changed from "not clear to release" to "clear to release". A "not clear to release" status message is transmitted whenever the status of a logical output queue has reverted to "not clear to release". The clearance status of each logical output queue is monitored at the input side by retaining and updating a single status bit which has a particular binary value (e.g., a "0") when the last-received status message indicates logical output queue's status as "not clear to release" and the opposite binary value (e.g., a "1") when the last-received status message indicates logical output queue's status as "clear to release". The input side may then, in a logical order, release discrete information units from logical output queues whose clearance status is indicated as "clear to release" from the input side to the output side. By limiting the transfer frequency and input-retained bit-count of clearance status information to the instances and information required to effectuate the logical order for releasing discrete information units, control traffic and status buffering requirements are further reduced.

In yet another aspect, the present invention avoids another problem of "per cell" handshaking by re-transmitting the most recent content status (and clearance status) messages whenever extra bandwidth is available. By re-transmitting content status (and clearance status) messages, any inaccurate view of the content and clearance status of logical output queues which develops as a result of the failure of original content status (and clearance status) messages to be delivered is eventually cured, even if it is not known that the original transmission failed, and without adding bandwidth requirements.

Of course, the present invention need not by implemented reflexively. Content status messages may be used in conjunction with conventional "per cell" grants, rather than clearance status messages. Alternatively, clearance status messages may be used in conjunction with conventional "per cell" requests, rather than content status, messages. Similarly, implementations are possible wherein content status messages are re-transmitted whereas clearance status messages are not, or vice versa.

These and other objects of the present invention may be better understood by reference to the following detailed description, taken in conjunction with the accompanying drawings which are briefly described below. Of course, the actual scope of the invention is defined by the appended claims.

DETAILED DESCRIPTION OF THE PREFERRED EMBODIMENT

Figure 2:
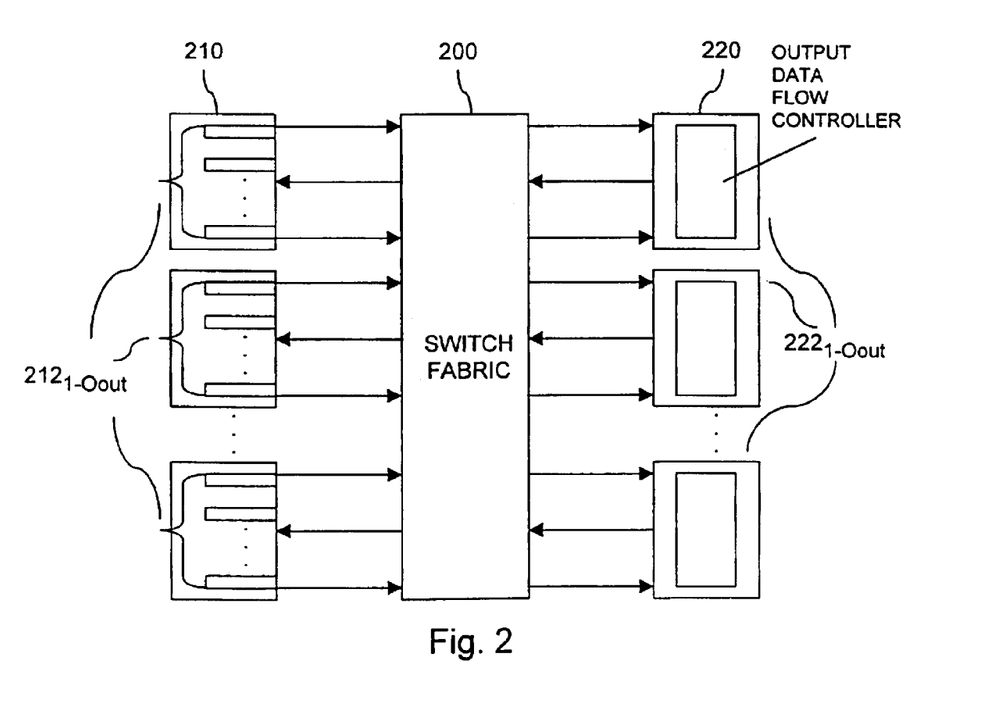
FIG. 2 is a block diagram of a digital traffic switch in which the present invention may be used.

Referring to FIG. 2, the general architecture of a digital traffic switch incorporating the present invention is shown. Multiple inputs and multiple outputs are coupled via a switch fabric 200 such that every input port (and its associated input buffer control unit) may communicate with every output port (and its associated output data flow control unit), and every output port (and its associated output data flow control unit) may communicate with every input port (and its associated input buffer control unit). At any given instant in time, a subset (or all) of the source input-output processors (IOP) 210 receive digital traffic destined for a subset (or all) of the destination IOP 220. Digital traffic may therefore be imagined as flowing from left to right, from source IOP 210 to destination IOP 220. Each source IOP may have one or more associated input ports and each destination IOP may have one or more associated output ports.

Within each source IOP 210, there is an input buffer control unit which dynamically segregates inbound discrete information units by destination output port and priority to define distinct logical output queues for storage of the units within an input buffer. For a source IOP supporting O output ports, and P levels of priority, the source IOP's input buffer will, therefore, have O×P logical output queues (residing physically within the input buffer). Collectively, the logical output queues $212_{(1-Oout)\times(1-P)}$ of the source IOP 210 function as an output buffer because they contain discrete information units queued based on the source IOP, destination output port and priority level of the data. Further, each group of P logical output queues for a particular destination output port is controlled by that destination IOP's data flow control unit. The input buffer control unit cannot release a discrete information unit from its input buffer to the destination output port (via the switch fabric and output rate buffer unit) without the consent of the destination IOP's output data flow control unit $222_{1-Oout}$. In a preferred embodiment, a "standing" consent to release may be provided through the transmission from the destination IOP and receipt by the source IOP of a single "clear to release" status message, although in alternative embodiments "per cell" consent may be provided through the transmission and receipt of a plurality of grants to release a single discrete information unit.

Figure 3:
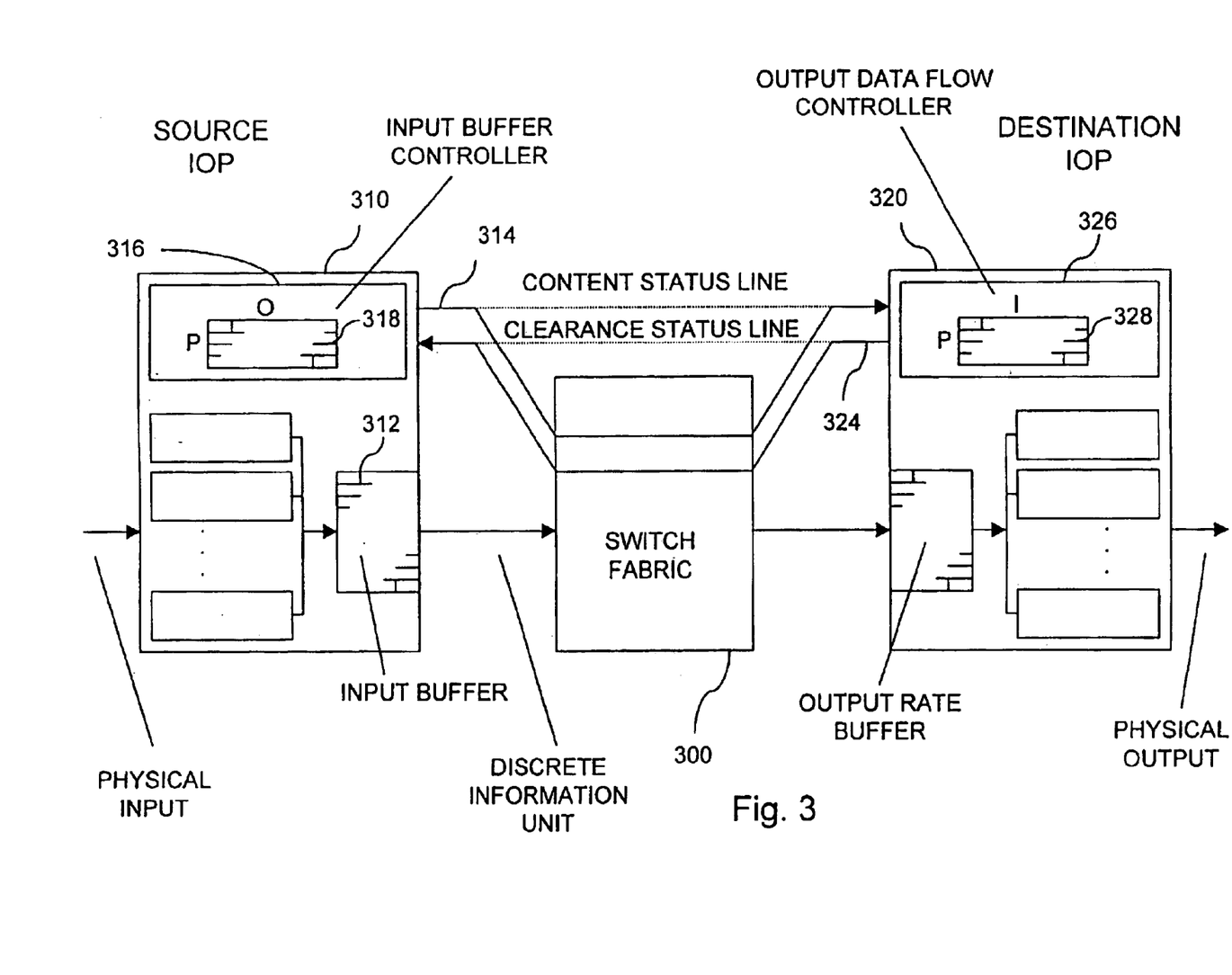
FIG. 3 is a block diagram showing in greater detail the control flow between the input buffer control unit and the output data flow control unit, and vice versa, as well as the data flow between the input buffer unit and the output buffer unit.

FIG. 3 isolates the connection between a representative source IOP 310 and destination IOP 320. The source IOP transmits content status messages for its logical output queues to the destination IOP 320 via the switch fabric 300. Content status messages are transmitted on content status message line 314 directed from the source IOP's input buffer control unit 316 to the destination IOP's output data flow control unit 326. Content status messages include "not empty" status messages and "empty" status messages. "Not empty" status messages are transmitted whenever the first discrete information unit has been received in a logical output queue. "Empty" status messages are transmitted whenever the last discrete information unit has been released from a logical output queue. Of course, "first" discrete information unit as used herein refers not just to the discrete information unit which is the first ever received in the logical output queue, but rather to all discrete information units which are received at a time when all discrete information units once pending in the logical output queue have been released. Similarly, "last" discrete information unit refers not just to the discrete information unit which is the last ever released from the logical output queue, but rather to any discrete information unit which is released at a time when all other discrete units once pending in the logical output queue have been released. Each status message includes information sufficient to identify the logical output queue to which the message pertains and a content status value indicating the content status of that logical output queue, i.e., "empty" or "not empty".

The destination IOP 320 transmits clearance status messages for its logical output queues to the source IOP 310. Clearance status messages are transmitted on clearance status line 324 directed from the destination IOP's output data flow control unit 326 to the source IOP's input buffer control unit 316. Clearance status messages include "clear to release" status messages and "not clear to release" status messages. A "clear to release" status message is transmitted whenever the output data flow control unit has generated the first outstanding grant for a logical output queue. A "not clear to release" status message is transmitted whenever a discrete information unit arrives at the output rate buffer and consumes the last outstanding grant for the logical output queue. Each clearance status message includes information sufficient to identify the logical output queue to which the message pertains and a clearance status value indicating the clearance status of that logical output queue, i.e., "clear to release" or "not clear to release". Content status messages and clearance status messages may be transmitted through the switch fabric 300 or may be transmitted out-of-band.

Status messages are re-transmitted on clock cycles during which all bandwidth on line 314 or 324, respectively, is not consumed by the transmission of new content status messages or new clearance status messages, respectively. Through re-transmission of status messages on an "available bandwidth" basis, status message transmission failures will eventually be cured without adding bandwidth requirements.

Status messages may be transmitted in various ways. In a preferred embodiment, lines 314 and 324 are each multi-bit buses for transmitting at least one multi-bit logical output queue identifier and a single-bit status value on each clock cycle. In an alternative embodiment, each logical output queue may be assigned a dedicated one-bit line for conveying status messages by pulsing or failing to pulse the line high. In yet another alternative embodiment, logical output queues may be assigned to one of a plurality of shared one-bit lines for conveying status messages and the logical output queues sharing a line may be assigned different time slots in a repetitive timing cycle for conveying status messages by pulsing or failing to pulse the line on their assigned time slots. Of course, the number of logical output queues may determine the relative suitability of the various available techniques for conveying status messages.

In order to effectuate the contemplated buffer control strategy, the output data flow control unit 326 within the destination IOP 320 tracks the content status of the P logical output queues within the source IOP 310 that may have discrete information units destined for it and the P logical output queues within every other source IOP that may have discrete information units destined for it. Thus, for the destination IOP 320 supporting I source IOP and P levels, of priority, a bit memory 328 is provided within the output data flow control unit 326 having I×P bit locations. Different bit locations hold different status values reflecting the most recently transmitted content status of different ones of the I×P logical output queues for the aggregate of source IOPs that may have discrete information units destined for destination IOP 320. Each time the output data flow control unit 326 receives a content status message for a logical output queue on line 314 (or on a content status line for another source IOP), it replaces the current status value held in the bit location in memory 328 reserved for the logical output queue with the status value included in the status message. Thus, in a switch where a content status value of "0" indicates that a logical output queue is "empty" and a content status value of "1" indicates that a logical output queue is "not empty", a status message transmitted after the first discrete information unit has been received in a logical output queue would include a status value of "1" and would replace a status value of "0" at the bit location reserved for the logical output queue. Similarly, a status message transmitted after the last pending discrete information unit has been released from a logical output queue would include a status value of "0" and would replace a status value of "1" at the bit location reserved for the logical output queue.

In a similar vein, the input buffer control unit 316 within the source IOP 310 tracks the clearance status of the P logical output queues for each of the destination output ports that it may have discrete information units destined for. For the source IOP 320 supporting O destination output ports and P levels of priority, a bit memory 318 is provided within the input buffer control unit 316 having O×P bit locations. Different bit locations hold a status value reflecting the most recent clearance status of different ones of the O×P logical output queues for the aggregate of destination output ports for which the source IOP may have discrete information units destined. Each time the input buffer control unit 316 receives a clearance status message for a logical output queue on line 324 (or on a clearance status line for another destination IOP), it replaces the current clearance status value held in the bit location in memory 318 reserved for the logical output queue with the status value included in the status message. Thus, in a switch where a clearance status value of "1" indicates that a logical output queue is "clear to release" and a status value of "0" indicates that a logical output queue is "not clear to release", a clearance status message transmitted in response to the generation of the first outstanding grant for a logical output queue would include a status value of "1" and would replace a status value of "0" at the bit location reserved for the logical output queue. Similarly, a clearance status message transmitted in response to the consumption of the logical output queue's last outstanding grant would include a status value of "0" and would replace a status value of "1" at the bit location reserved for the logical output queue.

The basic buffer control strategy implemented in the switch is as follows. Upon start-up, the content status of all logical output queues is initialized (at destination IOP) as "empty" and the clearance status of all output queues is initialized (at source IOP) as "not clear to release". A discrete information unit (e.g., an ATM cell) destined for a destination output port and having a particular priority arrives at a particular source IOP. The source IOP's input buffer control unit buffers the discrete information unit in the appropriate logical output queue and sends a content status message to the appropriate destination IOP's output data flow control unit. The content status message contains information sufficient to identify the logical output queue to which the message pertains and a status value indicating the new content status of that logical output queue, i.e., "not empty" The current content status value held in the bit location reserved for the logical output queue (i.e., "empty") is replaced with the status value included in the status message (i.e., "not empty"). Because the bit location now indicates "not empty" status, the logical output queue will eventually be issued a grant in accordance with an operative grant generation algorithm conducted by the destination IOP's output data flow control unit. Upon issuance of such a grant, the output data flow control unit responds to the source IOP's input buffer control unit with a clearance status message. The clearance status message contains information sufficient to identify the logical output queue to which the message pertains and a status value indicating the new clearance status of that logical output queue, i.e., "clear to release". The current clearance status value held in the bit location reserved for the logical output queue (i.e., "not clear to release") is replaced with the status value included in the status message (i.e., "clear to release"). Because the bit location now indicates "clear to release" status, the source IOP's input buffer control unit will eventually release the discrete information unit to the switch fabric for final delivery to the destination IOP's output rate buffer unit in accordance with an operative release algorithm conducted by the source IOP's input buffer control unit. Upon release of the discrete information unit, the source input port's input buffer control unit sends a content status message to the destination output port's output data flow control unit containing information sufficient to identify the logical output queue to which the message pertains and a status value indicating the new status of that logical output queue, i.e., "empty". The current content status value held in the bit location reserved for the logical output queue (i.e., "not empty") is replaced with the status value included in the status message (i.e., "empty"). Because the bit location has now reverted to "empty" status, the logical output queue will not (for the time being) be issued any more grants in accordance with the operative grant generation algorithm. The content and release status of the logical output queue have at that point returned to their initial state and the logical output queue awaits the arrival of the next discrete information unit.

The buffer control strategy has been described above in relation to the first-ever discrete information unit received in a logical output queue. More generally, content status messages are always transmitted in response to changes in the content status of logical output queues. A change in content status occurs whenever the first discrete information unit has been received in a logical output queue and whenever the last discrete information unit has been released from a logical output queue. Inbound discrete information units are buffered in logical output queues by input buffer control units after segregating them by destination output port and priority. Discrete information units are released from a logical output queue in a release algorithm conducted by each input buffer control unit among its associated logical output queues. Accordingly, a "not empty" status message is transmitted whenever the number of discrete information units pending in a logical output queue has changed from zero to one, indicating that a discrete information unit is pending in the logical output queue whereas before it was not. An "empty" status message is transmitted whenever the number of discrete information units pending in a logical output queue has changed from one to zero, indicating that a discrete information unit is no longer pending whereas before it was. Similarly, clearance status messages are always transmitted in response to changes in the grant status of logical output queues. A change in grant status occurs whenever the first grant for a logical output queue is issued and whenever the last grant for a logical output queue is consumed. Grants are issued to a logical output queue in a grant generation algorithm conducted by each output data flow control unit among its associated logical output queues. Grants issued to a logical output queue are consumed or "taken-down" whenever a discrete information unit from the logical output queue has arrived at the output rate buffer. Accordingly, a "clear to release" status message is transmitted whenever the number of outstanding grants for a logical output queue has changed from zero to one, indicating that a grant for the logical output queue has become available where before it was not. A "not clear to release" status message is transmitted whenever the number of outstanding grants for a logical output queue has changed from one to zero, indicating that a grant for the logical output queue is no longer available where before it was.

Various modifications of this basic buffer control strategy are possible. Nevertheless, at a fundamental level, this basic buffer strategy represents a significant advance over the DIBOC buffer control strategies of the prior art.

Input buffer control units have read and write pointers for tracking the number of outstanding grants for each logical output queue with which the input buffer control unit's source IOP is associated.

Output data flow controllers have grant counters for tracking the number of outstanding grants for each logical output queue with which the output data flow controller's destination IOP is associated and for tracking various other categories of outstanding grants. In addition to the number of outstanding grants for each logical output queue, grant counters track, for the destination IOP, the aggregate number of outstanding grants, the number of outstanding grants by source IOP, the number of outstanding grants by destination output port and the number of outstanding grants by priority level. All grant counters are used to limit the grants outstanding to a "maximum allowable" number for the different categories tracked. In this way, output bandwidth requirements are respected and a threshold level of fairness in bandwidth allocation may be ensured. Upon start-up, all grant counters are initialized at zero. Whenever a logical output queue has been prospectively selected for issuing a grant pursuant to the grant generation algorithm conducted by the output data flow controller, all corresponding outstanding grant counters are incremented and compared with the predetermined maximum allowable to determine if any such limit would be exceeded by allowing the grant to issue. If no such limit would be exceeded, the grant is allowed to issue. If any such limit would be exceeded, the corresponding grant counters are decremented, the grant is not allowed to issue and the grant generation algorithm continues.

Figure 4:
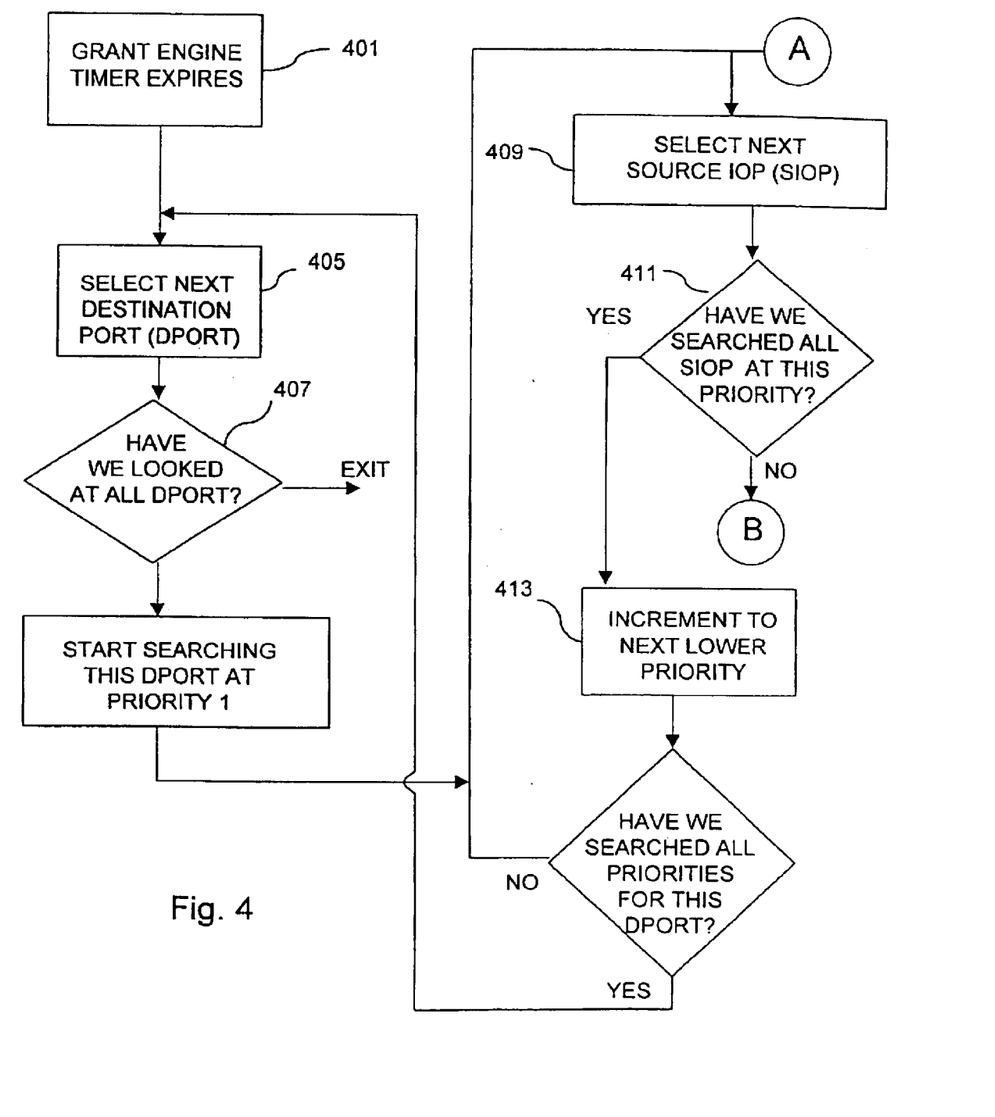
FIGS. 4 and 5 are flow diagrams of a grant generation algorithm used in a preferred embodiment to effectuate the issuance of grants to logical output queues in a logical order.

Referring now to FIG. 4, the grant generation algorithm, implemented by a representative output data flow control unit, will be described in greater detail. The output data flow control unit is not allowed to issue grants "at will". Rather, successive grants must be spaced apart by some minimum amount of time. Therefore, in Step 401, the output data flow control unit waits until its grant engine timer has expired before issuing another grant.

Once sufficient time has elapsed, the grant generation algorithm proceeds as follows: (1) service associated destination output ports round-robin; and (2) for the current destination output port, issue a grant to the logical output queue whose status is "not empty" for the next source IOP in a round-robin order at the highest relative priority.

In Step 405, therefore, the next destination output port in a round-robin order is selected. If all of the destination output ports have already been considered and none of them are able to accept another discrete information unit (Step 407), then the algorithm is exited. Otherwise, the algorithm selects the next destination output port and priority "1" (i.e., highest priority). The algorithm selects the next source IOP in a round-robin order (Step 409). If all priority "1" logical output queues have been searched for this source IOP (Step 411), priority "2" (i.e., the next highest priority) is selected (Step 413), the algorithm returns to Step 409 and the search is repeated at the new priority. If all priorities for the current destination output port have been searched, the algorithm returns to Step 405, the next destination output port is selected, and the search is repeated at the new destination output port.

Figure 5:
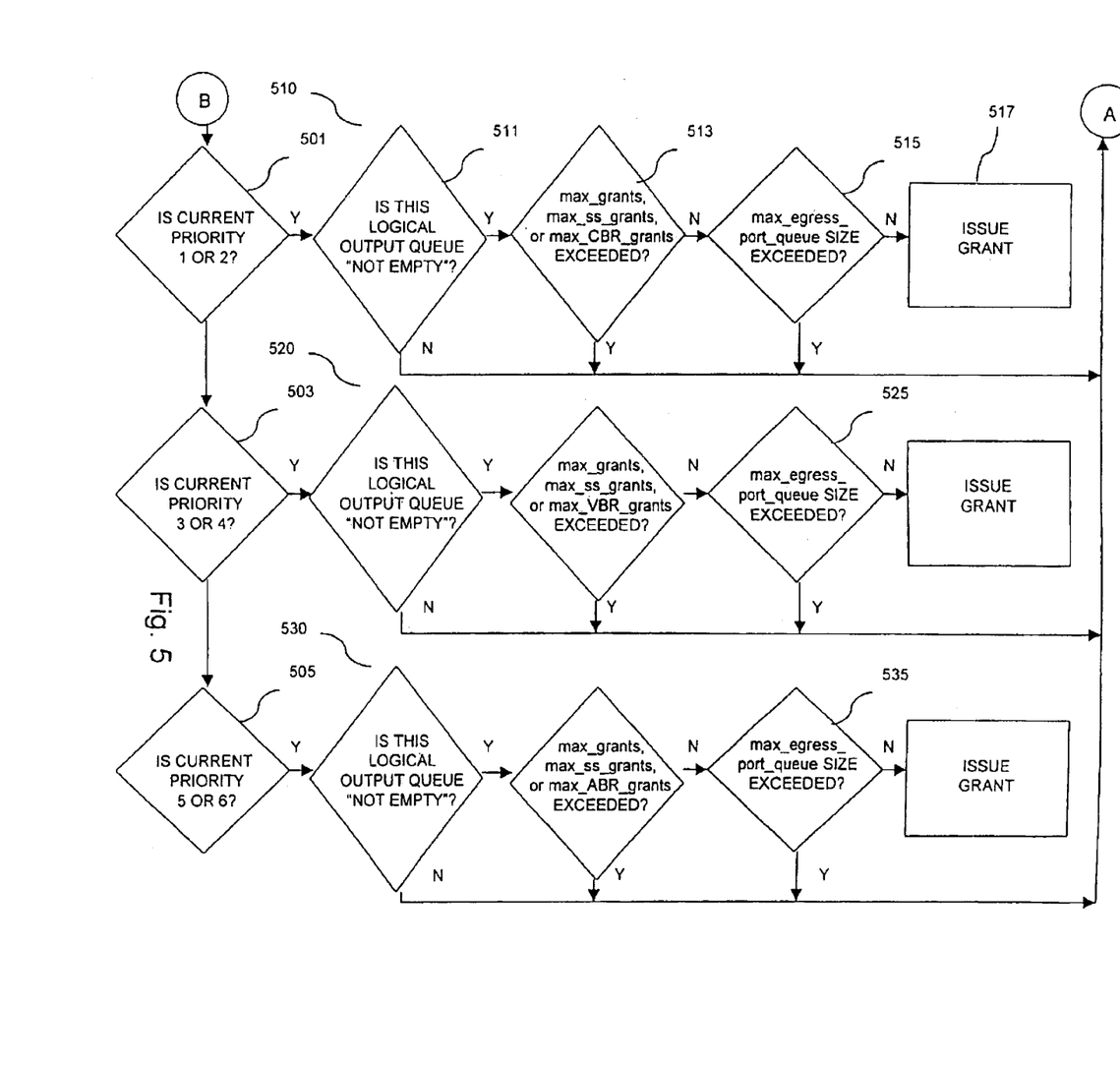

Assuming that in Step 411 a determination is made that not all source IOP have been searched at the current priority, the algorithm proceeds to point "B" in FIG. 5. Referring now to FIG. 5, in a preferred embodiment, the algorithm proceeds by following one of three paths depending on the current priority. If the current priority is "1" or "2" (Step 501), the algorithm follows path 510. If the current priority is "3" or "4" (Step 503), the algorithm follows path 520. If the current priority is "5" or "6" (Step 505), the algorithm follows path 530.

Paths 510, 520, 530 ask whether the current logical output queue is exhibiting "not empty" status, i.e., has indicated that it has a discrete information unit for release, and whether, if it has so indicated, issuing a grant to the logical output queue would violate a grant limit. In this regard, each destination IOP is allowed to have only a certain number of total grants to be outstanding at any given time, a certain number of grants to be outstanding for particular priorities at any given time, a certain number of grants to be outstanding for a particular source IOP at any given time, and a certain number of grants to be outstanding for a particular destination output port at any given time. In the case of priority, a destination IOP is allowed a specified number of outstanding grants for priority "1" and "2" (e.g., CBR, or constant bit rate) traffic, a specified number of outstanding grants for priority "3" and "4" (e.g., VBR, or variable bit rate) traffic, and a specified number of grants for priority "5" and "6" (e.g., ABR, or available bit rate and UBR, or undefined bit rate) traffic. Such grant limits ensure a certain level of fairness and avoid output rate buffer overflow. Returning momentarily to FIG. 3, discrete information units must enter the fabric 300 by way of an input buffer 316. Similarly, discrete information units must leave the fabric 300 by way of an output rate buffer. If there is no room in the output rate buffer, issuing a grant might cause existing data to be overwritten. Predetermined grant limits are enforced to prevent such an overflow condition.

The nature of the grant limitations on paths 510, 520, 530 is essentially the same. Considering path 510 by way of example, in Step 511, the algorithm determines whether the current logical output queue exhibits "not empty" status. If not, no grant is issued and the algorithm returns to point "A" in FIG. 4. If so, then various grant limitations are checked in Step 513, including whether the maximum allowable number of outstanding grants (1) issued by this destination IOP (MAX_GRANTS), (2) issued by this destination IOP to a single source IOP (MAX_SS$_{13}$GRANTS), or (3) issued by this destination IOP at the current priority (MAX_CBR$_{13}$GRANTS), would exceeded by issuing another grant. If any of these limits would be exceeded, the algorithm returns to point "A" in FIG. 4 without issuing a grant. If none of these limits would be exceeded, the algorithm checks in Step 515 whether the maximum allowable number of grants issued to the current destination output port would be exceeded by issuing a grant (MAX_EGRESS$_{13}$PORT_QUEUE). If so, the algorithm returns to point "A" in FIG. 4 without issuing a grant. If, however, the inquiries at Step 515 reveals that this final limit would not be exceeded by issuing a grant, the output data flow control unit proceeds in Step 517 to issue a grant and the algorithm is exited.

The grant generation algorithm may be implemented in software using a general-purpose microprocessor. More preferably, the algorithm is implemented in hardware as part of an application specific integrated circuit (ASIC). In the latter instance, the flow diagram of FIGS. 4 and 5 describes not the execution of program instructions but the logical operation of the ASIC.

Figure 6:
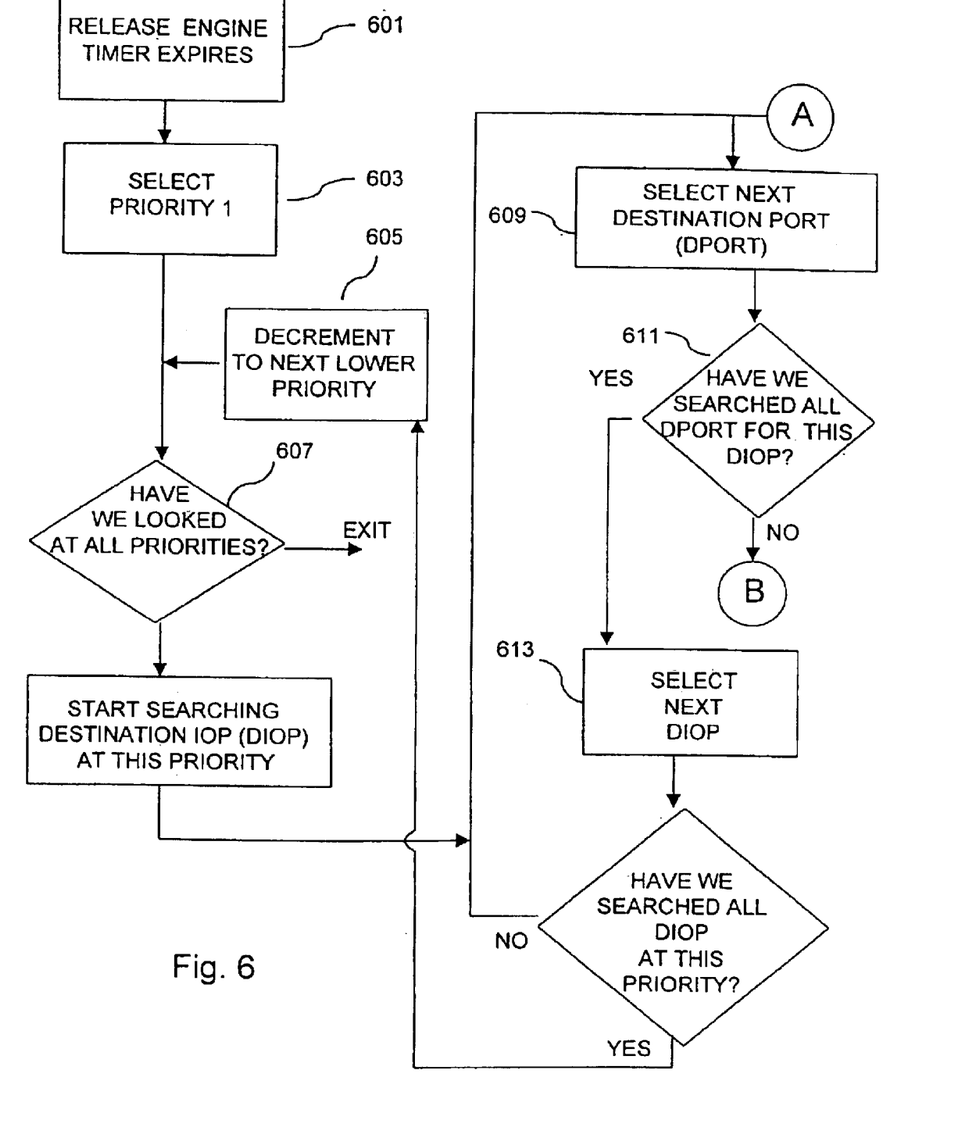
FIGS. 6 and 7 are flow diagrams of an release algorithm used in a preferred embodiment to effectuate the release of discrete information units from logical output queues in a logical order.

Referring now to FIG. 6, the release algorithm, implemented in the input buffer control units to release discrete information units from logical output queues, will be described in greater detail. The input buffer control unit is not allowed to release discrete information units "at will". Rather, successive discrete information units must be spaced apart by some minimum amount of time. Therefore, in Step 601, the input buffer control unit waits until its grant engine timer has expired before releasing another discrete information unit. Naturally, if more than one discrete information unit is buffered in a particular logical output queue, the discrete information units are released first in, first out.

Once sufficient time has elapsed, the release algorithm proceeds as follows: (1) service the higher relative priorities first; and (2) for the current priority, release a discrete information unit from the logical output queue whose status is "clear to release" for the next destination output port in a round-robin order for the current destination IOP selected in a round-robin order.

In Step 603, therefore, the priority "1" (i.e., the highest priority) is selected. The algorithm selects the next destination IOP in a round-robin order (Step 609). If all priority "1" logical output queues have been searched for this destination IOP (Step 611), the next destination IOP is selected (Step 613), the algorithm returns to Step 609 and the search is repeated at the new destination IOP. If all destination IOP for the current priority have been searched, the algorithm returns to Step 605 and the next priority is selected. If all of the priorities have already been considered and none of them are able to release a discrete information unit (Step 607), then the algorithm is exited. Otherwise, the algorithm searches the next destination IOP at the new priority.

Figure 7:
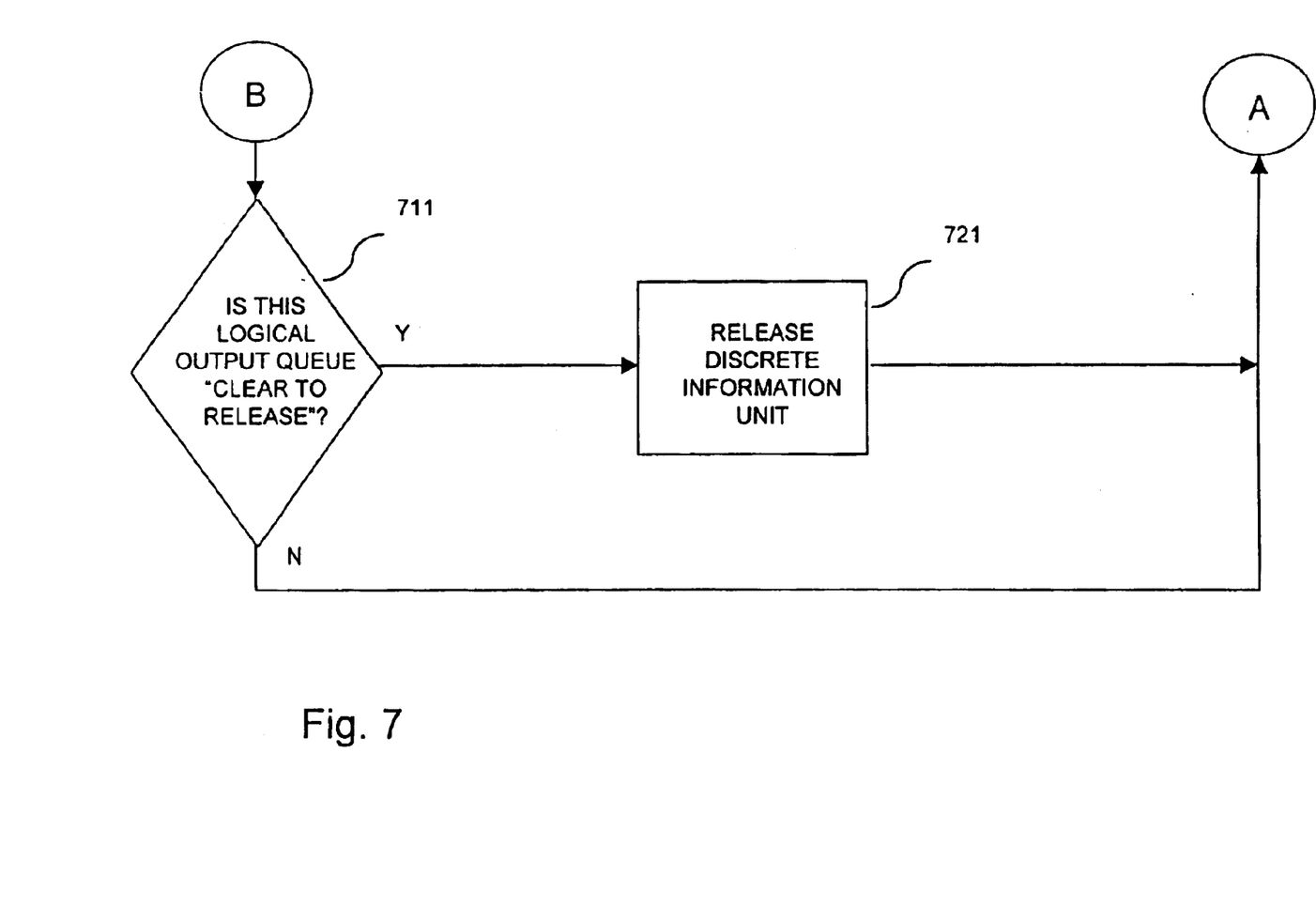

Assuming that in Step 611 a determination is made that not all destination IOP have been searched at the current priority, the algorithm proceeds to point "B" in FIG. 7. Referring now to FIG. 7, in a preferred embodiment, the algorithm determines whether the current logical output queue exhibits "clear to release" status. If not, no discrete information unit is released and the algorithm returns to point "A" in FIG. 6. If so, the input buffer control unit proceeds in Step 721 to release a discrete information unit and the algorithm is exited.

Numerous alternative embodiments are possible. In one alternative embodiment, content status messages are implemented with conventional grants. In this embodiment, the output side transmits to the input side every release grant generated by the grant generation algorithm. The input side monitors the grants received for each logical output queue and releases discrete information units based on the number of grants received for logical output queues rather than the clearance status of the logical output queues.

In another alternative embodiment, clearance status messages are implemented with conventional requests. In this embodiment, the input side transmits to the output side a request to release for each discrete information unit. The output side monitors the requests received for each logical output queue and issues grants based on the number of requests received for logical output queues rather than the content status of the logical output queues.

In yet another alternative embodiment, status messages contain information sufficient to identify only the logical output queue to which they pertain and are not re-transmitted. Because status messages are sent only when there is a change in status, the receiving device (i.e., input buffer controller or output data flow controller) knows automatically to change the status value held in the bit location reserved for the logical output queue (i.e., from "1" to "0", or from "0" to "1") whenever a status message is received. Of course, in this embodiment, failures in status message transmission are not curable by re-transmission, unless it can be known that the original transmission failed.

In the foregoing manner, a digital traffic switch may be provided that enjoys the "best of both worlds", i.e., enjoys the advantages of DIBOC without the side effects of "per cell" handshaking (e.g., unnecessary traffic loads, unnecessary status buffering requirements and inability to correct inaccurate views of status).

It will be appreciated by those of ordinary skill in the art that the invention can be embodied in other specific forms without departing form the spirit or essential character hereof. The present description is therefore considered in all respects illustrative and not restrictive. The scope of the invention is indicated by the appended claims, and all changes that come within the meaning and range of equivalents thereof are intended to be embraced therein.

What is claimed is:

1. A method of controlling buffering of a discrete information unit of digital data for use within a digital switch having multiple source input ports, multiple destination output ports, and a switch fabric for switching a discrete information unit received at any of the source input ports to any of the destination output ports, wherein each source input port is associated with an input unit including an input buffer having a plurality of logical output queues and wherein each destination output port is associated with an output unit, the method comprising:

on an input unit, changing by one the number of discrete information units buffered in a logical output queue within an input buffer, the logical output queue reserved for buffering discrete information units received on the input unit and having a particular priority level; and transmitting a queue status message from the input unit to an output unit if the change was an incrementing of the number of discrete information units buffered in the logical output queue from zero to one, or the change was a decrementing of the number of discrete information units buffered in the logical output queue from one to zero.

2. The method of claim 1, wherein the priority level is associated with a quality of service to be rendered to a buffered discrete information unit.

3. The method of claim 1 further comprising storing in the output unit a bit identifying a status of the logical output queues indicated by the queue status message.

4. The method of claim 1 further comprising incrementing in the output unit, in response to a queue status message transmitted as a result of an incrementing of the number of discrete information units buffered in the logical output queue from zero to one, a number of outstanding discrete information unit release grants for the logical output queue.

5. The method of claim 1, wherein the logical output queue is reserved for buffering discrete information units destined for a particular output port.

6. A method of controlling buffering of a discrete information unit of digital data for use within a digital switch having multiple source input ports, multiple destination output ports, and a switch fabric for switching a discrete information unit received at any of the source input ports to any of the destination output ports, wherein each source input port is associated with an input unit including an input buffer having a plurality of logical output queues and wherein each destination output port is associated with an output unit, the method comprising:

on an output unit, changing by one the number of outstanding discrete information unit release grants for a logical output queue residing within an input buffer on a particular input unit, the logical output queue reserved for buffering discrete information units received on the particular input unit and having a particular priority level; and transmitting a queue status message from the output unit to the particular input unit if the change was an incrementing of the number of outstanding release grants for the logical output queue from zero to one, or the change was a decrementing of the number of outstanding release grants for the logical output queue from one to zero.

7. The method of claim 6, wherein the priority level is associated with a quality of service to be rendered to a buffered discrete information unit.

8. The method of claim 6, further comprising releasing at the particular input unit, in response to a queue status message transmitted as a result of an incrementing of the number of outstanding release grants for the logical output queue from zero to one, a discrete information unit stored in the logical output queue.

9. The method of claim 6, wherein the logical output queue is reserved for buffering discrete information units destined for a particular output port.

10. The method of claim 6, wherein the number of outstanding grants is incremented by issuing a grant to the logical output queue in an order determined by a grant generation algorithm.

11. The method of claim 6, wherein the number of outstanding grants is decremented by receiving a discrete information unit from the logical output queue.

12. A digital switch for controlling buffering of a discrete information unit of digital data, the digital switch comprising:

an input port;

an input unit coupled to the input port, the input unit including an input buffer having a logical output queue having a particular priority level;

an output port; and an output unit coupled to the output port, characterized in that the input unit changes a number of discrete information units buffered in the logical output queue by one, further characterized in that the input unit transmits a queue status message to the output unit if the change was an incrementing of the number of discrete information units buffered in the logical output queue from zero to one, or the change was a decrementing of the number of discrete information units buffered in the logical output queue from one to zero.

13. The switch of claim 12, wherein the priority level is associated with a quality of service to be rendered to a buffered discrete information unit.

14. The switch of claim 12 further characterized in that the output unit stores a bit identifying a status of the logical output queue as indicated by the queue status message.

15. The switch of claim 12 further characterized in that the output unit increments, in response to a queue status message transmitted as a result of an incrementing of the number of discrete information units buffered in the logical output queue from zero to one, a number of outstanding discrete information unit release grants for the logical output queue.

16. The switch of claim 12, wherein the logical output queue is reserved for buffering discrete information units destined for a particular output port.

17. A digital switch for controlling buffering of a discrete information unit of digital data, the digital switch comprising:

an input port;

an input unit coupled to the input port, the input unit including an input buffer having a logical output queue having a particular priority level;

an output port; and an output unit coupled to the output port, characterized in that the output unit changes by one a number of outstanding discrete information unit release grants for the logical output queue residing within the input buffer, further characterized in that the output unit transmits a queue status message to the input unit if the change was an incrementing of the number of outstanding release grants for the logical output queue from zero to one, or the change was a decrementing of the number of outstanding release grants for the logical output queue from one to zero.

18. The switch of claim 17, wherein the priority level is associated with a quality of service to rendered to a buffered discrete information unit.

19. The switch of claim 17, further characterized in that the input unit releases, in response to a queue status message transmitted as a result of an incrementing of the number of outstanding release grants for the logical output queue from zero to one, a discrete information unit stored in the logical output queue.

20. The switch of claim 17, wherein the logical output queue is reserved for buffering discrete information units destined for a particular output port.

21. The switch of claim 17, wherein the number of outstanding grants is incremented by issuing a grant to the logical output queue in an order determined by a grant generation algorithm.

22. The method of claim 17, wherein the number of outstanding grants is decremented by receiving a discrete information unit from the logical output queue.

* * * * *